Figure 1:
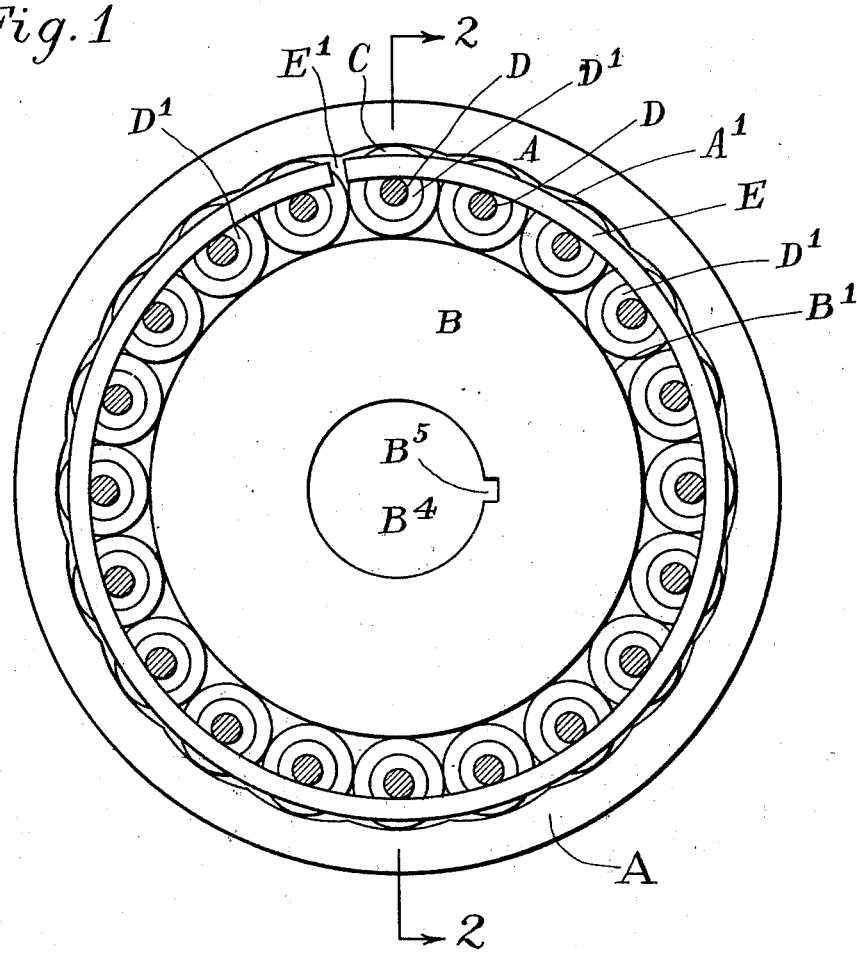

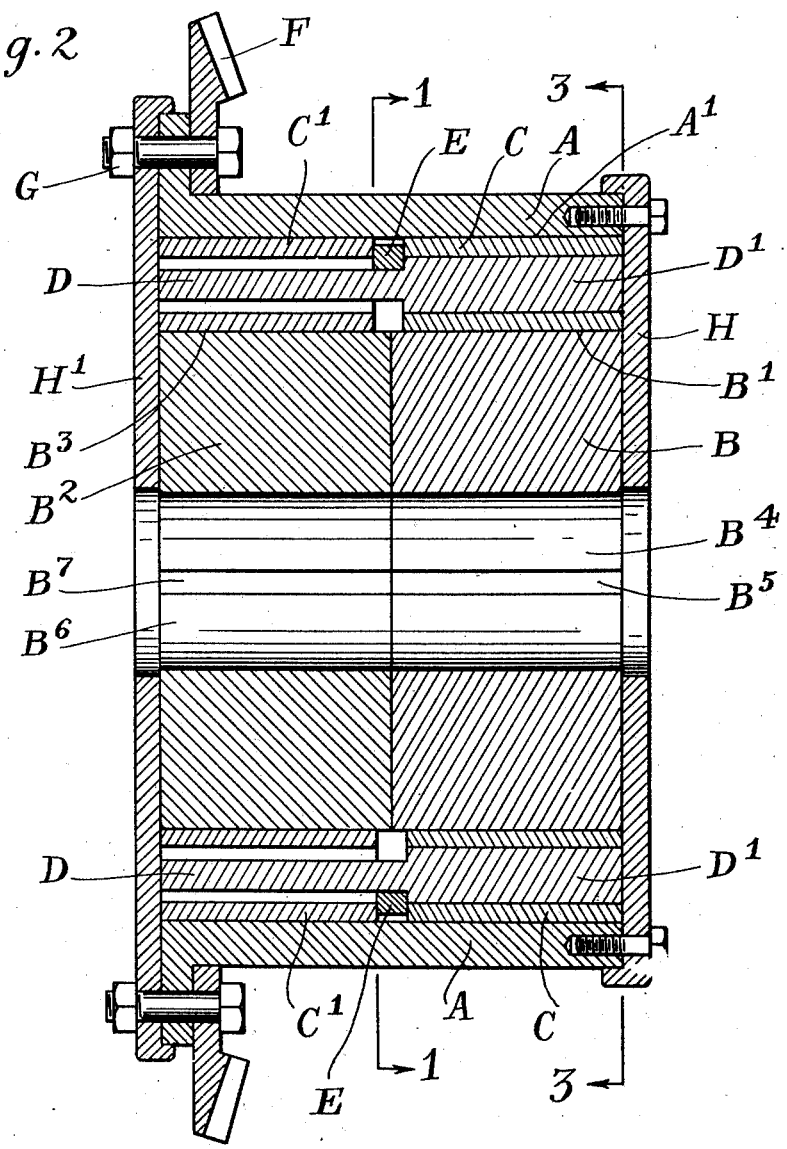

March 26, 1929.  C. ANDRADE, JR  1,706,867
ROLLER LOCKING DEVICE
Filed Dec. 21, 1925  3 Sheets-Sheet 3
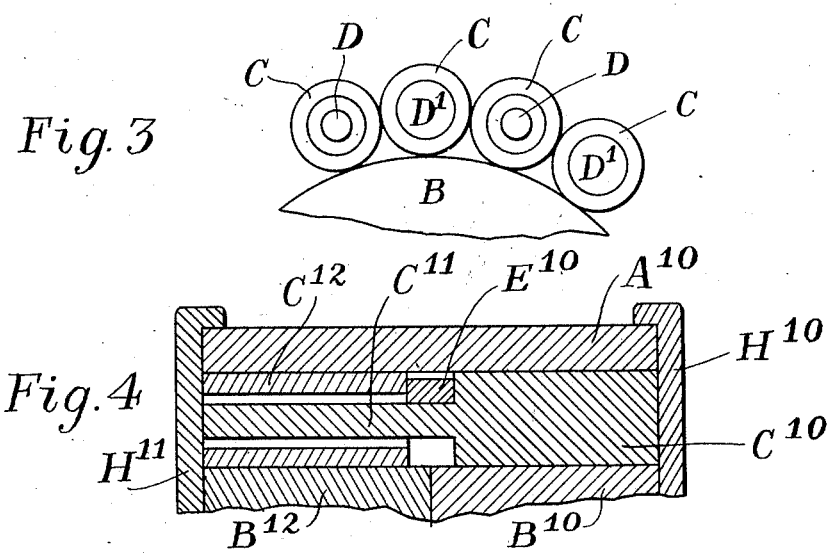
INVENTOR
Cipriano Andrade Jr.

Patented Mar. 26, 1929.

1,706,867

UNITED STATES PATENT OFFICE.

CIPRIANO ANDRADE, JR., OF NEW YORK, N. Y.

ROLLER-LOCKING DEVICE.

Application filed December 21, 1925. Serial No. 76,843.

My invention relates to roller locking devices, and the object of my invention is to produce a roller locking device which will eliminate any back lash or slippage before the rollers finally lock.

I attain this object by the mechanism illustrated in the accompanying drawings in which:

Fig. 1 is a sectional end view of my device in neutral position as applied to a roller locking differential of the type disclosed by my issued Patents No. 1,505,124 and No. 1,505,687, taken on the line 1—1 of Fig. 2, but with member $B^2$ not shown; Fig. 2 is a longitudinal sectional side view of the same device shown completely, on the line 2—2 of Fig. 1; Fig. 3 is a partial end view of a part of the same device on the line 3—3 of Fig. 2; and Fig. 4 is a diagramatic sectional side view of a portion of my device as applied to a roller locking differential of the type disclosed by my issued Patent No. 1,505,124.

Similar letters and numerals refer to similar parts throughout the several views.

A is the two way driving member of a roller locking differential; and $A^1$ are the two way locking eccentric arcs thereof; B is a driven member thereof; $B^1$ is the outer circumferential locking surface of B; $B^2$ is the other driven member thereof; $B^3$ is the outer circumferential locking surface of $B^2$; $B^4$ is the shaft hole in driven member B; and $B^5$ is the keyway thereof; $B^6$ is the shaft hole in driven member $B^2$; and $B^7$ is the keyway thereof; C are the locking rollers over driven member B; $C^1$ are the locking rollers over driven member $B^2$; D are the clearance ends of control rods $D^1$; E is one form of the essential element of my present invention which consists of a spring element in circumferential form with an opening $E^1$, and is so constructed that normally it will shrink to a smaller diameter than shown in Fig. 1, and therefore when expanded outwardly and forced over the clearance ends D of control rods $D^1$, it exerts a constant radial pressure inward, thus forcing the locking rolers C and $C^1$, which hold the $D^1$ ends of the control rods, into constant radial pressure with the outer surface $B^1$ of driven member B, and the outer surface $B^3$ of driven member $B^2$. In Fig. 2 rollers C alone are shown holding the $D^1$ ends of the control rods, but on reference to Fig. 3, and as fully disclosed in my cited patents, the clearance ends of the control rods are preferably alternately placed. F is the usual master gear fastened by bolts G to driving member A and to end flange $H^1$; H is the end flange at the opposite end of the differential; in Fig. 4, $A^{10}$ is a two way driving member, with locking rollers $C^{10}$ on driven member $B^{10}$, and locking rollers $C^{12}$ on driven member $B^{12}$, and $C^{11}$ is a clearance control rod integral with locking roller $C^{10}$, $E^{10}$ is a spring element in circumferential form operating on clearance control rod $C^{11}$ substantially the same as shown in my Figs. 1, 2 and 3, $H^{10}$ and $H^{11}$ are end flanges.

The operation of my device is as follows:

In roller locking devices, in two way driving members in differentials, the rollers lock on the smooth cylindrical surface of the driven member. In some forms, as shown in my Figs. 1, 2, 3, 4, the driving member is outside of the driven member, and therefore in that form of device, whenever the entire structure is revolving, the radial throw tends to force the rollers completely away from the outer surface of the driven member and to hold the rollers in the neutral centres of the arcs on the inside face of the driving member, the result of which is backlash, slippage, and, in some cases of rapid rotation, complete impossibility of locking the rollers. This difficulty is further increased by the gradual congealing and hardening of the lubricants generally used in such devices, which gradually create a film on the outer surface of the driven member, and the inner locking surface of the driving member, and cause the rollers to remain at a fixed position in the inner locking surface of the driving member, and to rotate idly about the circumference of the driven member without locking. The function of my device as illustrated in said Figs. 1, 2, 3, 4, is to hold the rollers always in contact with the outer surface of the driven member, even when the entire device is rotating, the inward radial pressure of my spring device being sufficient to neutralize and overcome the outward radial throw caused by the rotation, and as this inward pressure of my spring device is always operative, it prevents the lubricant from creating a film on the outer surface of the driven member. In addition to the elimination of backlash, the spring E as shown in Figs.

1 and 2, and the spring $E^{10}$ in Fig. 4, has another valuable function absolutely independent of the elimination of the backlash. This other valuable function of the spring E or $E^{10}$ between the inner ends of the rollers, as shown in Figs. 2 and 4 hereof, is that it will prevent the two opposite sets of rollers from ever getting in direct end contact with each other, which direct end contact with each other might possibly destroy the differential function of said rollers, because for example one of the left hand rollers might be caught at its outer end side surface by the outer end side surfaces of its opposite rollers, which would make it impossible for the left hand set of rollers to move circumferentially in relation to the right hand set of rollers. This valuable independent function of preventing the two opposite sets of rollers from ever getting in direct end contact with each other could be created by the spring even if it had lost its pressure on the control rods. The two independent functions of the spring above mentioned, could of course be secured also by eliminating the opening $E^1$ in spring E of Fig. 1 hereof, thus creating a completely solid circular ring of close fit on the control rods in the same position as spring E in Fig. 1 hereof, which close fit would prevent the rollers from ever touching the neutral centers of the locking eccentric arcs $A^1$, and would hold the rollers in actual contact with the locking surface of the driven members B and $B^2$, as for example in Figs. 1 and 2 hereof. Exactly the same substitution of a solid circular ring could be made in place of the spring $E^{10}$, or any mechanical equivalent thereof. And with this solid circular ring, just as with the spring, the independent function of preventing the two opposite sets of rollers from ever getting in direct end contact with each other could be created by the solid circular ring even if it did not have a tight pressure on the control rods. It will also be understood that the driven members instead of being inside the rollers as shown herein, could be outside of the rollers as well known in the prior art, in which case the spring or the solid circular ring would be set inside of the control rods to produce the necessary outward pressure on the control rods. It will also be understood that instead of a spring about $\frac{1}{32}$ of an inch radially solid, as shown in Fig. 1 hereof, another well known form of spring could be used composed of spring metal say $\frac{1}{32}$ of an inch radial thickness and set in 3 or 4 continuous circles one over the other. And in the claims the term "practically cylindrical element" will mean either a spring of the forms hereinbefore stated or a solid circular ring as hereinbefore stated or any mechanical equivalents thereof.

It will be understood that I do not intend to limit my present invention to the various precise forms here shown, as these forms are merely illustrative of my device.

As previously stated these combinations herein specifically mentioned do not of course cover all the mechanical equivalents thereof, and I do not limit my invention to the exact forms shown in my drawings or specifically mentioned in my specification. For example instead of the exact form of differential shown in Fig. 2 hereof, my present device of spring or solid circular ring could be applied for example to my form of differential as shown in my pending patent application Serial No. 138,157.

I claim:

1. In a roller locking device; a first driven member with a cylindrical locking surface; a second driven member with a cylindrical locking surface; a driving member with a two way locking surface eccentric to the cylindrical locking surfaces of the two driven members; a first multipilicity of rollers adapted to lock the first driven member with the driving member; a second multiplicity of rollers adapted to lock the second driven member with the driving member; control rods in conjunction with said first multiplicity of rollers; control rods in conjunction with said second multiplicity of rollers; and a practically cylindrical element adapted to remain in constant contact with a multiplicity of both sets of said control rods, whereby the first multiplicity of rollers are held in constant contact with the locking surface of the first driven member, and whereby the second multiplicity of rollers are held in constant contact with the locking surface of the second driven member.

2. In a roller locking device; a first driven member with a cylindrical locking surface; a second driven member with a cylindrical locking surface; a driving member with a two way locking surface eccentric to the cylindrical locking surfaces of the two driven members; a first multiplicity of rollers adapted to lock the first driven member with the driving member; a second multiplicity of rollers adapted to lock the second driven member with the driving member; control rods in conjunction with said first multiplicity of rollers; control rods in conjunction with said second multiplicity of rollers; and a practically cylindrical element placed between the ends of said two sets of rollers, and adapted to prevent said two sets of rollers from meeting endwise, and also adapted to remain in constant contact with a multiplicity of both sets of said control rods, whereby the first multiplicity of rollers are held in constant contact with the locking surface of the first driven member, and whereby the second multiplicity of rollers are held in constant contact with the locking surface of the second driven member.

3. In a roller locking device; a first driven member; a second driven member; a driving member; a first multiplicity of rollers adapted to lock the first driven member with the driving member; a second multiplicity of rollers adapted to lock the second driven member with the driving member; and a practically cylindrical element placed between the ends of said two sets of rollers and adapted to prevent said two sets of rollers from meeting endwise, and further adapted to hold each set of rollers in constant radial contact with each driven member.

4. In a roller locking device; a first driven member; a second driven member; a driving member; a first multiplicity of rollers in contact with each other adapted to lock the first driven member with the driving member; a second multiplicity of rollers in contact with each other adapted to lock the second driven member with the driving member; control rods in conjunction with said first multiplicity of rollers; control rods in conjunction with said second multiplicity of rollers; and a practically cylindrical element placed between the ends of said two sets of rollers, and adapted to prevent said two sets of rollers from meeting endwise, and also adapted to remain in constant contact with a multiplicity of both sets of said control rods, whereby the first multiplicity of rollers are held in constant contact with the locking surface of the first driven member, and whereby the second multiplicity of rollers are held in constant contact with the locking surface of the second driven member.

5. In a roller locking device; a first driven member; a second driven member; a driving member; a first multiplicity of rollers adapted to lock the first driven member with the driving member; a second multiplicity of rollers adapted to lock the second driven member with the driving member; and a practically cylindrical element placed between the ends of said two sets of rollers, and adapted to prevent said two sets of rollers from meeting endwise.

CIPRIANO ANDRADE, JR.